United States Patent
Li et al.

(10) Patent No.: US 7,826,664 B2
(45) Date of Patent: Nov. 2, 2010

(54) SYSTEMS AND METHODS FOR EFFICIENT MANUAL WINDOWING OPERATION

(75) Inventors: Xing Li, Wester, NY (US); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 929 days.

(21) Appl. No.: 10/851,145

(22) Filed: May 24, 2004

(65) Prior Publication Data

US 2005/0273578 A1 Dec. 8, 2005

(51) Int. Cl.
- G06K 9/34 (2006.01)
- G06K 9/00 (2006.01)
- G06K 9/40 (2006.01)
- H04N 1/40 (2006.01)
- H04N 1/46 (2006.01)
- G06F 15/16 (2006.01)

(52) U.S. Cl. ............... 382/173; 382/112; 382/175; 382/180; 382/254; 358/448; 358/530; 345/502

(58) Field of Classification Search ............... 382/173, 382/254

See application file for complete search history.

(56) References Cited

U.S. PATENT DOCUMENTS

| | | | |
|---|---|---|---|
| 4,760,463 A * | 7/1988 | Nonoyama et al. | 358/452 |
| 4,887,163 A * | 12/1989 | Maeshima | 358/443 |
| 5,079,625 A * | 1/1992 | Kitamura et al. | 358/537 |
| 5,086,346 A * | 2/1992 | Fujisawa | 358/453 |
| 5,162,918 A * | 11/1992 | Muramatsu | 358/300 |
| 5,202,967 A * | 4/1993 | Matsuzaki et al. | 712/212 |
| 5,220,416 A * | 6/1993 | Hasebe et al. | 358/517 |
| 5,339,172 A * | 8/1994 | Robinson | 358/462 |
| 5,363,212 A * | 11/1994 | Taniuchi et al. | 358/452 |
| 5,406,389 A * | 4/1995 | Hasegawa et al. | 358/452 |
| 5,448,655 A * | 9/1995 | Yamaguchi | 382/304 |
| 5,481,372 A * | 1/1996 | Kouno et al. | 358/426.12 |
| 5,513,282 A * | 4/1996 | Williams | 382/303 |
| 5,552,900 A * | 9/1996 | Someya | 358/452 |
| 5,710,839 A * | 1/1998 | Cok | 382/264 |
| 5,937,233 A * | 8/1999 | Nakata et al. | 399/85 |
| 5,953,462 A * | 9/1999 | Yamada et al. | 382/284 |
| 6,198,553 B1 * | 3/2001 | Yamamoto et al. | 358/520 |
| 6,240,205 B1 * | 5/2001 | Fan et al. | 382/173 |
| 6,345,118 B1 * | 2/2002 | Ideyama | 382/175 |
| 6,507,415 B1 * | 1/2003 | Toyoda et al. | 358/450 |
| 6,625,312 B1 * | 9/2003 | Nagarajan et al. | 382/176 |
| 6,670,963 B2 * | 12/2003 | Osberger | 345/629 |
| 6,976,223 B1 * | 12/2005 | Nitschke | 715/764 |
| 2001/0041012 A1 * | 11/2001 | Hsieh et al. | 382/234 |

* cited by examiner

Primary Examiner—Matthew C Bella
Assistant Examiner—Jose M Torres
(74) Attorney, Agent, or Firm—Oliff & Berridge, PLC

(57) ABSTRACT

A method and system of manual windowing within a displayed image is disclosed, which include specifying different windows within a displayed image, assigning tags to different windows, assigning processing channels to the windows, processing the different windows on the basis of the assigned tags and assembling the different windows. A scanner is disclosed which sends image data to a manual window construction module which specifies a plurality of windows within a displayed image and which assigns specific tags to each one of the plurality of windows. According to various exemplary embodiments, the windows are processed separately and re-assembled by a processor.

17 Claims, 2 Drawing Sheets

SYSTEMS AND METHODS FOR EFFICIENT MANUAL WINDOWING OPERATION

BACKGROUND OF THE INVENTION

1. Field of Invention

This invention is related to scanning systems in general, and in particular to manual windowing operations.

2. Description of Related Art

The purpose of manual windowing is generally to enable the assignment of user-defined tags to one or more windows or bounded regions within a displayed image. These tags are generally used to control the processing of the windows to which they are assigned. In systems in which there is no hardware assistance, manual windowing can be significantly demanding because an original image has to be scanned a plurality of times, where each scan generates one window within the original image. The multiple scans, each containing one window which has been manually treated, are sent to a host computer for finally assembly of the displayed image.

SUMMARY OF THE INVENTION

Although the tags discussed above for the plurality of windows can be specified at once, conventional systems generally do not have enough resources readily available to process different parts of image data differently at the same time.

In light of the above described problems and shortcomings, various exemplary embodiments of the methods according to this invention provide a method of manual windowing within a displayed image, that includes specifying a plurality of windows within the displayed image, assigning a plurality of tags to the specified windows, assigning processing channels to the windows, and processing each specified window by each assigned channel on the basis of the assigned tags of each specified window.

According to various exemplary embodiments of the systems of this invention, a system of manual windowing within a displayed image is provided, which includes an image data source such as, for instance, a scanner, and a manual window construction module. According to various exemplary embodiments, the manual window construction module receives image data from the image data source, enables the specification of a plurality of windows within the image, and enables the assignment of specific tags to each of the plurality of windows. Moreover, the system includes an image processing module that comprises a memory, that receives the specified plurality of windows from the manual window construction module, and that processes the plurality of windows via a plurality of processing channels, the plurality of processing channels processing the plurality of windows on the basis of the tags assigned by the manual window construction module to the plurality of windows. Finally, the system includes an output selection module that selects the processed windows and transmits the selected processed windows to a processor.

Also, various exemplary embodiments of the systems and methods according to this invention provide for a machine readable medium that provides instructions for manual windowing, the instructions, when executed by a processor, cause the processor to perform operations that include specifying a plurality of windows within the displayed image, assigning a plurality of tags to the specified windows, assigning processing channels to the windows, and processing each specified window by each assigned channel on the basis of the assigned tags of each specified window.

Finally, various exemplary embodiments of the systems and methods according to this invention provide for a xerographic marking device that includes an image data source such as, for instance, a scanner, and a manual window construction module. According to various exemplary embodiments, the manual window construction module receives image data from the image data source, enables the specification of a plurality of windows within the image, and enables the assignment of specific tags to each of the plurality of windows. Moreover, the system includes an image processing module that comprises a memory, that receives the specified plurality of windows from the manual window construction module, and that processes the plurality of windows via a plurality of processing channels, the plurality of processing channels processing the plurality of windows on the basis of the tags assigned by the manual window construction module to the plurality of windows. Finally, the system includes an output selection module that selects the processed windows and transmits the selected processed windows to a processor.

BRIEF DESCRIPTION OF THE DRAWINGS

Various exemplary embodiments of the systems and methods of this invention will be described in detailed, with reference to the following figures, wherein.

DETAILED DESCRIPTION OF EXEMPLARY EMBODIMENTS

These and other features and advantages of this invention are described in, or are a parent from, the following detailed description of various exemplary embodiments of the systems and methods according to this invention.

Figure 1:
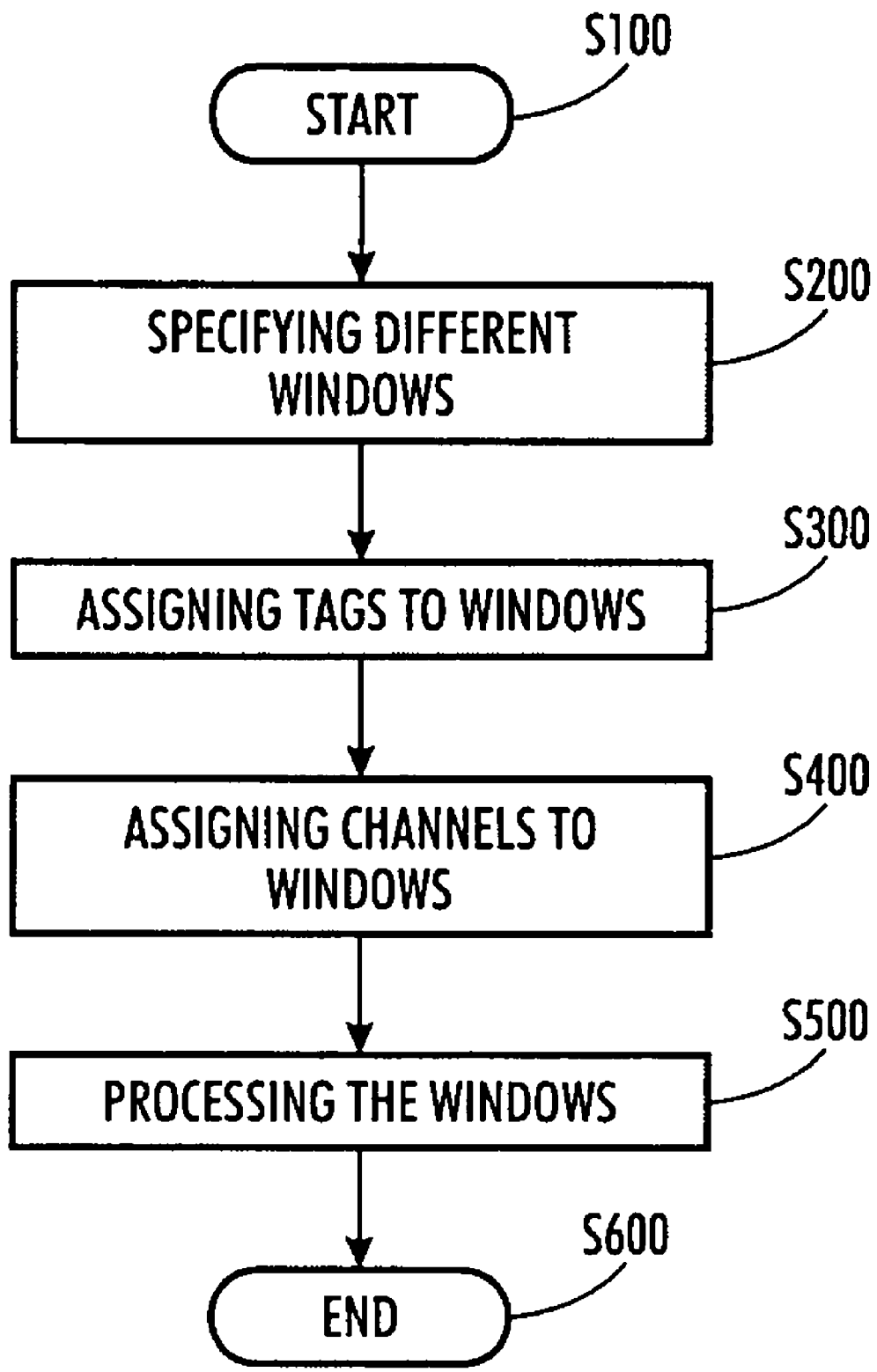
FIG. 1 is a flowchart illustrating an exemplary method of manual windowing of a displayed image according to this invention.

FIG. 1 is a flowchart illustrating an exemplary method of manual windowing of a displayed image according to this invention. The method starts in step S100 and continues to step S200. In step S200, different windows, or bounded regions within a displayed image, are manually specified by a user. According to various exemplary embodiments, specifying different windows is performed by determining the coordinates of the different windows and identifying the different windows with their coordinates.

Next, control continues to step S300, where specific tags are assigned to the different windows within the displayed image. According to various exemplary embodiments, tags are used to specify the type of image data within the window such as, for instance, a low frequency half-tone, which then defines the pixels that are part of the specified window as being of that specific type. For example, a pixel located inside a window will be assigned a tag that defines that pixel as being a continuous tone pixel. Another pixel, located inside another window, will be assigned a tag that defines that other pixel as being a graphic arts pixel. Moreover, a window is defined by its coordinates within the displayed image. Accordingly, the pixels which coordinates are within the boundaries of that window are assigned the same tag as the window tag. As such, all the pixels located inside that window are defined as being from the same type. In some cases, however, when text pixels are within a window, the text pixels may have different tags than the rest of the pixels inside the window.

Control continues to step S400. In step S400, one or more windows are assigned to a channel that, for example, is part of a marking system. The mapping of windows to channels is internally done without any user control. A channel from the channels already present, for example, in a color system, is used in step S400 to process the one or more windows that are assigned to that specific channel. Accordingly, by distributing the processing of the plurality of windows that constitute the image among a plurality of channels, a more efficient and fast use of the resources of the marking system can be achieved.

Control next continues to step S500. In step S500, the windows are individually processed for image quality and rendering in each of the channels that the windows were assigned to in step S400. According to various exemplary embodiments, in step S500, by virtue of being distributed among different processing channels as described in step S400, all the different windows are processed separately.

As discussed above, the processing of the windows is performed using a plurality of channels and filters, and different windows are assigned to different channels for processing. As such, processing efficiency and speed is improved because a given channel processes a specific window or windows, and another channel processes other different windows. For example, one or more windows within the displayed image are processed by a first channel, one or more other windows are processed by a second channel, and yet one more other windows are processed by a third channel. As such, the processing of the entire displayed image is distributed among different channels which perform processing of the windows at the same time, and hence increase processing efficiency of the displayed image. After the different windows have been processed, then control continues to step S600, where the method ends.

It should be noted that, during the window processing step S500, each pixel within a given window and which is assigned a specific tag, is processed on the basis of its assigned tag. Other pixels, which are part of other windows, are also processed on the basis of their specific tags.

According to various exemplary embodiments, the portions of the displayed image that are not part of the windows that were specified during step S200 are automatically processed by the system on the basis of standard processing requirements.

According to various exemplary embodiments, when a specific window has been processed during step S500, the processed window is stored in memory, and the resources used to process that window are then used again to process another window from the same displayed image. Accordingly, the same resources may be used one or more times to process different windows within the same displayed image.

It should be noted that, if the system contains enough resources, then processing of all the different windows can be performed at the same time without reusing the same resources for different windows.

Figure 2:
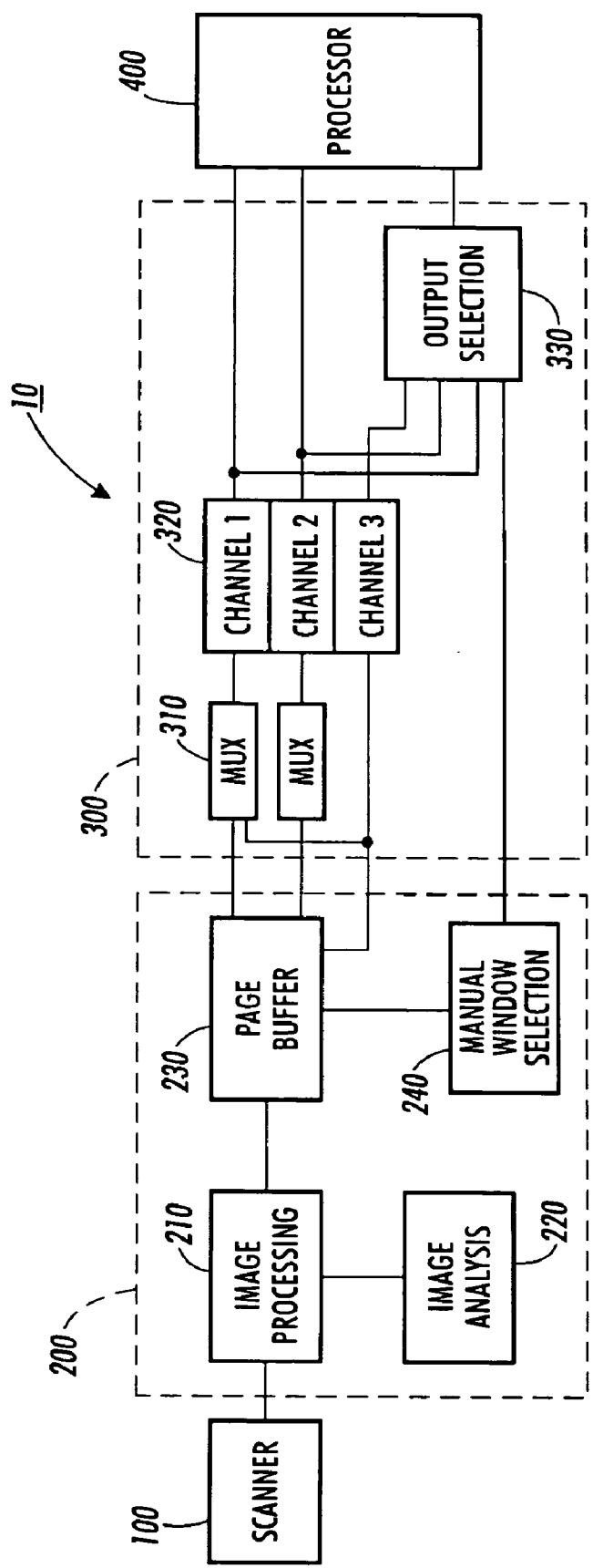
FIG. 2 is block diagram illustrating an exemplary system of manual windowing of a displayed image according to this invention.

FIG. 2 is a block diagram illustrating an exemplary system of manual windowing of a displayed image according to this invention. As shown in FIG. 2, the system 10 includes a scanner 100 that transmits image data to a manual window construction module 200 that is functionally coupled to the scanner 100. It should be noted that, although FIG. 2 illustrates a scanner that sends image data to the manual window construction module 200, various other sources of image data may be used, such as digital photographic apparatus, digital image source, and the like.

In the exemplary embodiment, the manual window construction module 200 is functionally coupled to an image processing module 300. Furthermore, the image processing module 300 is functionally coupled to a process 400.

In the exemplary embodiment, the manual window construction module 200 comprises a front end image processing module 210, a pre-buffer image analysis module 220 and a page buffer module 230. The front end image processing module 210 includes a converter that converts, for example, a device dependent color space to a device independent color space. Moreover, the pre-buffer image analysis 220 assigns automatically generated tags or default tags to the portions of the displayed image which are not included in regions specified as windows.

According to various exemplary embodiments, the assignment of automatically generated tags or defaults tags to the non-window portions can be performed either before or after the manual assignment of tags to the window portion. Accordingly, although these non-window portions are not manually processed, these non-window portions may be automatically processed prior to manual processing of the windows. It should be noted that, according to various exemplary embodiments, the same resources may be used for both the manual processing and the automatic processing.

The page buffer 230 includes a memory that is used to store, for example, the entire displayed image. The page buffer 230 may be used to store the entire displayed image in the case where specific windows of the displayed image are treated successively while using the same resources. Accordingly, the page buffer 230 allows storage of the displayed image while individual windows within the displayed image are being processed.

The manual window selection module 240 performs the selection of different windows within the displayed image and performs the assignment of tags for each pixel within each one of the individual windows. For example, the manual window selection module 240 determines the boundaries of a specific window and its corresponding coordinates within the displayed image. As such, the manual window selection module 240 determines the number, size and coordinates of the windows that will constitute the displayed image and that will be processed. According to various exemplary embodiments, the manual window selection module 240 also sends window information to the output selection module 330.

In the exemplary embodiment, the image processing module 300 includes a multiplexer (MUX) 310, a plurality of processing channels 320 and an output selection module 330. According to various exemplary embodiments, the MUX 310 participates in the handling of color input, or in the handling of monochrome input by the three channels. For example, for color inputs, each color plane goes into one channel. Further, for monochrome, the same plane may be input to different channels for efficient processing. Each of the channels 320 may perform the processing of different windows based on the assignment of each channel to one or more windows.

For example, if the displayed image is constituted of seven windows, as determined by the manual window selection module 240, then two of the windows are processed by a first channel 320, three more windows are processed by a second channel 320, and the remaining two windows are processed by a third channel 320. According to various exemplary embodiments, each channel has a plurality of processing units such as toner reproduction curves (TRCs), filters and dynamic range adjustment modules. Thus, each channel may handle multiple windows at the same time.

According to various exemplary embodiments, although each channel processes only specific windows, each channel has access to the entire displayed image stored in memory. Accordingly, in order to reconstruct the processed displayed image, the output selection module 330 selects the specific windows within each channel that have been processed by that channel and reconstitutes the displayed image, which is then sent to the processor 400. For example, the output selection module 330 selects, from each channel 320, the windows that have been processed by a specific channel, and these windows are transmitted to the processor 400. According to various exemplary embodiments, the output selection module 330 also transmits to the processor 400 the information relative to the tag assignment of the windows and of the non-window portions that was received from the manual window selection module 240. When the processor 400 receives all the processed windows that constitute the displayed image from all the channels, the processor 400 displays the processed displayed image. Since the processor 400 receives the entire displayed image from each channel, and since the displayed image contains both the windows processed by a specific channel along with windows not processed by that specific channel, the processor 400 displays only the windows that were processed by the different channels and discards the non-processed windows.

According to various exemplary embodiments, processing a window by a channel includes performing functions such as filtering, dynamic range adjustment, toner reproduction curve (TRC) adjustment, saturation adjustment in the case of color systems, rendering (converting contone data to binary data), and the like.

According to various exemplary embodiments, when processing monochrome images in a color system, the chrominance channels are made available for simultaneous processing of different parts of the monochrome displayed image. In state-of-the-art image processing chips, there are often multiple instances of image processing elements within each channel. For example, the channels already present in a color system are used to process one or more windows within a displayed image without the need for additional resources. Accordingly, by distributing processing among the channels 320, a more sophisticated manual windowing of the different windows specified within the displayed image can be performed at once. For example, when there are not enough resources to process an entire scan at once, the scan can be stored in the page buffer 230 and can then be accessed multiple times to use the available image processing resources to process different windows or portions with different parameters.

While the invention has been described in conjunction with exemplary embodiments, the embodiments should be viewed as illustrative, and not limiting. Various modifications, substitutes, or the like are possible within the spirit and scope of the invention.

What is claimed is:

1. A method of manual windowing of a displayed image, comprising:
   specifying one or more windows within the displayed image;
   assigning a plurality of tags to the specified windows;
   assigning a plurality of processing channels to one or more of the specified windows to process the one or more of the assigned windows;
   distributing processing of the specified windows, which constitute the displayed image, among the plurality of processing channels that process assigned windows at the same time;
   reusing at least one of the plurality of processing channels to process one of the specified windows by storing a processed window in a memory;
   processing each of the one or more specified windows by assigned channels on the basis of the assigned tags of each specified window; and
   controlling the processing of each specified window by each assigned channel via a processor, wherein the one or more windows are specified at least by a number, a size and coordinates, and each processing channel has a plurality of processing units, each processing unit including at least one of:
   filtering;
   performing saturation adjustments;
   performing dynamic range adjustments; and
   performing TRC adjustments;
   and each channel adapted to accommodate parallel processing,
   wherein portions of the displayed image that are not part of the specified windows are automatically processed on a basis of standard processing requirements.

2. The method of claim 1, wherein specifying the one or more windows within the displayed image is performed on an image displayed on a screen.

3. The method of claim 1, wherein assigning a plurality of tags to the specified windows is performed independently for each window.

4. The method of claim 1, wherein processing each of the one or more specified windows by each assigned channel on the basis of the assigned tags of each specified window is performed separately.

5. The method of claim 1, further comprising storing the displayed image in a buffer.

6. The method of claim 1, wherein the tag identifies a manual classification of the type of image data within the window.

7. A system of manual windowing of a displayed image, comprising:
   an image data source;
   a front end image processing module that receives image data from the image data source, and converts a device dependent color space of the image data to a device independent color space;
   a manual window construction module, the manual window construction module receiving converted image data from the front end image processing module, enabling the specification of one or more windows within the image at least by a number, a size and coordinates, and enabling the assignment of specific tags to each of the one or more windows;
   an image processing module that comprises a memory that receives the one or more specified windows from the manual window construction module, the image processing module assigning a processing channel to one or more of the specified windows to process the one or more of the assigned windows, distributing processing of the specified windows, which constitute the displayed image, among a plurality of processing channels that process assigned windows at the same time, and reusing at least one of the plurality of processing channels to process one of the specified windows by storing a processed window in a page buffer, the plurality of processing channels processing the specified windows on the basis of the tags assigned by the manual window construction module to the specified windows;
   an output selection module that selects the processed windows and transmits the selected processed windows to a processor that controls the processing of the one or more windows via the plurality of processing channels, wherein each processing channel has a plurality of processing units, each processing unit including at least one of:
filtering;
performing saturation adjustments;
performing dynamic range adjustments;
performing TRC adjustments; and
each channel adapted to accommodate parallel processing, and
wherein portions of the displayed image that are not part of the specified windows are automatically processed on a basis of standard processing requirements.

8. The system of claim 7, wherein the tags assigned to the one or more windows are separate for each window.

9. The system of claim 7, wherein the processing channels process the one or more windows separately.

10. The system of claim 7, wherein the one or more windows are stored in a buffer.

11. The system of claim 7, wherein the processor displays a processed image based on the processed windows received from the output selection module.

12. The system of claim 7, wherein
the plurality of processing channels are color processing channels, and the one or more specified windows are specified in a monochrome image data source.

13. The system of claim 7, wherein the tag identifies a manual classification of the type of image data within the window.

14. A computer-readable medium encoded with computer readable instructions that provides instructions for manual windowing within a displayed image, the instructions, when executed by a processor, cause the processor to perform operations comprising:
specifying one or more windows within the displayed image at least by a number, a size and coordinates;
assigning a plurality of tags to the specified windows;
assigning a plurality of processing channels to one or more of the specified windows to process the one or more of the assigned windows;
distributing processing of the specified windows, which constitute the displayed image, among the plurality of processing channels that process assigned windows at the same time;
reusing at least one of the plurality of processing channels to process one of the specified windows by storing a processed window in a memory;
parallel processing the one or more specified windows by each assigned channel on the basis of the assigned tags of each specified window; and
controlling the processing of each specified window by each assigned channel via a processor,
wherein each processing channel has a plurality of processing units, each processing unit including at least one of:
filtering;
performing saturation adjustments;
performing dynamic range adjustments; and
performing TRC adjustments, and
wherein portions of the displayed image that are not part of the specified windows are automatically processed on a basis of standard processing requirements.

15. The computer-readable medium of claim 14, wherein the tag identifies a manual classification of the type of image data within the window.

16. An image processing device, comprising:
an image data source;
a front end image processing module that receives image data from the image data source, and converts a device dependent color space of the image data to a device independent color space;
a manual window construction module, the manual window construction module receiving converted image data from the front end processing module, enabling the specification of one or more windows within the image at least by a number, a size and coordinates, and enabling the assignment of specific tags to each of the one or more windows;
an image processing module that comprises a memory that receives the one or more specified windows from the manual window construction module, the image processing module assigning a processing channel to one or more of the specified windows to process the one or more of the assigned windows, distributing processing of the specified windows, which constitute the displayed image, among a plurality of processing channels that process assigned windows at the same time, and reusing at least one of the plurality of processing channels to process one of the specified windows by storing a processed window in a page buffer, the plurality of processing channels processing the specified windows on the basis of the tags assigned by the manual window construction module to the specified windows, the plurality of processing channels adapted to accommodate parallel processing; and
an output selection module that selects the processed windows and transmits the selected processed windows to a processor that controls the processing of the one or more windows via the plurality of processing channels,
wherein each processing channel has a plurality of processing units, each processing unit including at least one of:
filtering;
performing saturation adjustments;
performing dynamic range adjustments; and
performing TRC adjustments, and
wherein portions of the displayed image that are not part of the specified windows are automatically processed on a basis of standard processing requirements.

17. The device of claim 16, wherein
the plurality of processing channels are color processing channels, and the plurality of specified windows are specified in a monochrome image data source.

* * * * *